S. B. EVERITT.
Tea Kettle.
No. 67,425.
Patented Aug. 6, 1867.
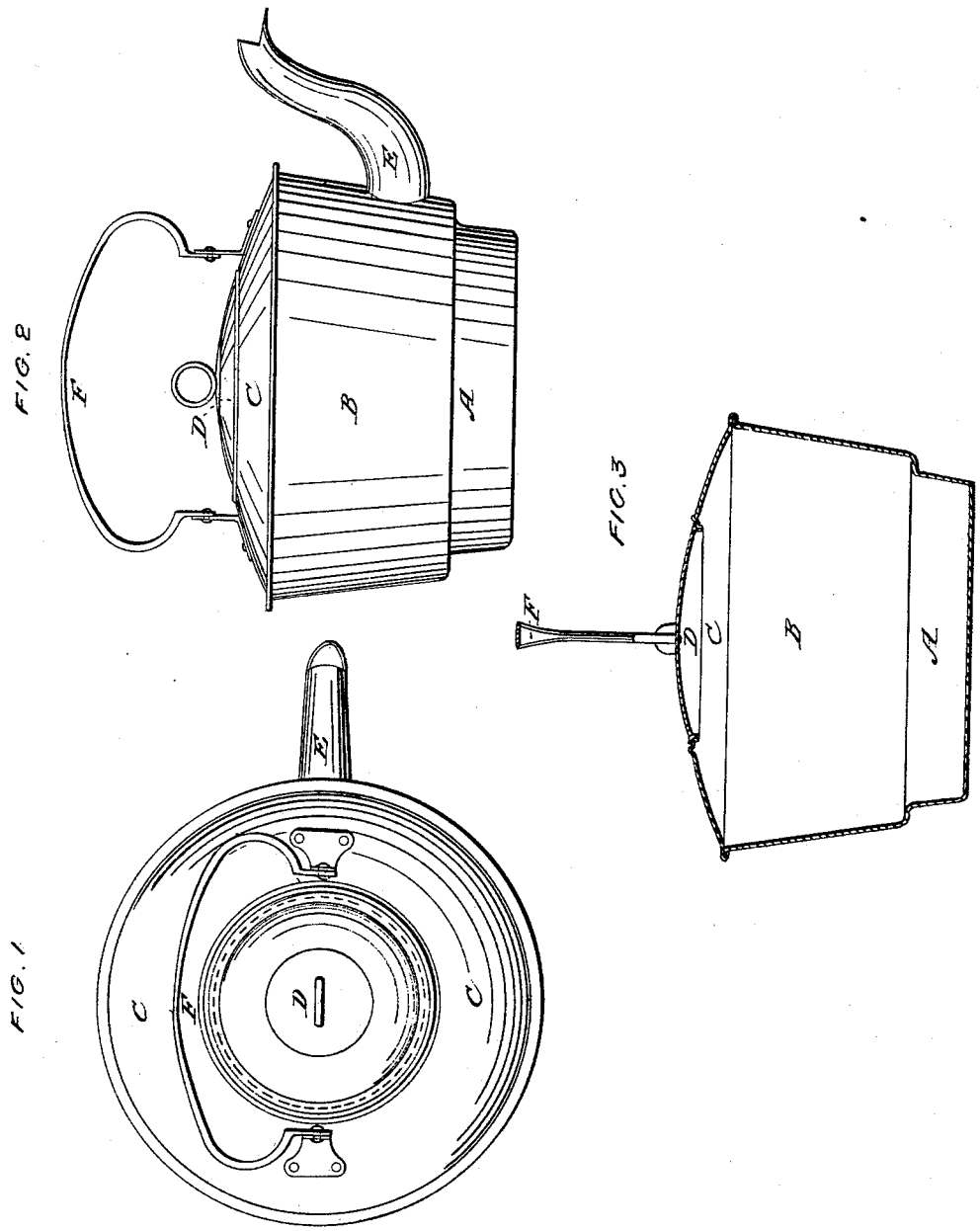
WITNESSES:
Sylvester Barbour
S. A. Cotter
INVENTOR:
Sheldon B Everett

United States Patent Office.

SHELDON B. EVERITT, OF ANSONIA, CONNECTICUT, ASSIGNOR TO HIMSELF AND J. H. BARTHOLOMEW, OF THE SAME PLACE, ASSIGNORS TO FREDERICK G. NIEDRINGHAUS, OF ST. LOUIS, MISSOURI.

Letters Patent No. 67,425, dated August 6, 1867.

IMPROVEMENT IN TEA-KETTLES AND OTHER VESSELS.

The Schedule referred to in these Letters Patent and making part of the same.

TO ALL WHOM IT MAY CONCERN:

Be it known that I, SHELDON B. EVERITT, of Ansonia, in the county of New Haven, and State of Connecticut, have invented a new and useful Improvement in Tea-Kettles and other Vessels constructed of sheet metal; and do hereby declare the following to be a full and exact description thereof, reference being had to the accompanying drawings, in which—

Figure 1 is a top view,

Figure 2 a side elevation, and

Figure 3 a vertical section of a vessel constructed in accordance with my said invention.

The nature of my invention consists of an improvement in the manufacture of cooking utensils made of "pressed tin" or iron, and relates more especially to the formation of a shallow basin or pit in the bottom of culinary vessels, whose body, or sides and bottom, are constructed of an entire seamless piece of wrought metal, whereby the bottom is adapted to fit the openings in the tops of cooking-stoves and ranges, so as to set therein and bring the contents of the vessel nearer the fire, and at the same time fully cover and close the opening.

In the accompanying drawings I have represented my invention as applied to a tea-kettle, wherein the seamless sides and bottom forming the body of the vessel are covered over at the top; but it is more generally applicable to saucepans, preserving-kettles, and other open-topped vessels, made entirely in one single piece.

In the drawings, A B represent such a vessel made of a single unbroken sheet of iron or other metal, which is usually tinned over. The metal is best formed into this shape by stamping or pressing it up gradually between suitable dies, and for saucepans or open kettles the work is completed by the simple addition of a handle or of a bail. B represents the sides or body of the vessel, and A the pit or sub-chamber, formed in the bottom by pressing down all that portion of the ordinary straight bottom between the points $x$ $x$, below the line $x$ $x$, so as to leave a bearing flange, $y$, encircling the pit or sub-chamber A. In finishing the vessel to form a tea-kettle, a breast, $c$, is united to the top edge of the seamless vessel A B in the usual manner, to cover over the body B of the vessel, a cover, D, being provided for the opening in the top, having a suitable rim or flange, $d$. This cover may be made seamless by pressing it out of a single piece of metal. A spout, E, is also inserted in the side of the vessel, and a bail, F, added to complete the same, as shown in the drawings.

It is well known that tea-kettles, saucepans, and other culinary vessels have heretofore been cast seamless in substantially the form herein described; but cast-iron vessels are not only expensive, but are very liable to crack or split by overheating or by careless knocks or blows. I am also aware that bottoms, having a pit, A, have been stamped in one piece out of sheet metal, to which suitable sides have been jointed to form a body, B, by soldering or riveting, the pit being usually formed deeper than the rim, which is left projecting from the flange to support the sides riveted or soldered thereto, but vessels constructed with these bottoms soon leak at the joint, and thus become useless.

Again, it is a fact that cooking utensils have been made and sold which are constructed wholly of one sheet of metal, pressed into the simple form of a plain bottom with upright sides. I disclaim, therefore, not only all forms of cast-metal vessels, and vessels having the sides or body made separate from the bottom, but also all vessels having plain bottoms, limiting my claim of invention wholly and solely to the improvement which I have made in seamless vessels, whose body or sides and bottom are made of one piece of wrought or sheet metal, by constructing the bottom of the vessel in the form herein specified, so that I am enabled, at a much cheaper cost, to supply a vessel having all the advantages, in form and construction, of a cast-iron solid or seamless vessel, without the disadvantages found in the ordinary forms of wrought-metal vessels heretofore made and in use.

Having thus fully described the nature of my invention, and the method of carrying the same into practical effect, I claim, as a new and useful improvement upon the ordinary seamless sheet-metal cooking utensils—

A sheet-metal kettle, saucepan, or similar deep vessel, whose sides and bottom are not only made seamless of one piece of metal, but which is also provided with a flanged bottom or pit, A, whose depth does not exceed that of the sides of the vessel, substantially as herein set forth.

In testimony whereof I have hereunto set my signature.

SHELDON B. EVERITT.

Witnesses:
SYLVESTER BARBOUR,
S. A. COTTER.